US012626863B2

(12) United States Patent
Hattori et al.

(10) Patent No.: US 12,626,863 B2
(45) Date of Patent: *May 12, 2026

(54) ELECTRONIC COMPONENT AND CAPACITOR

(71) Applicant: Panasonic Intellectual Property Management Co., Ltd., Osaka (JP)

(72) Inventors: Takayuki Hattori, Osaka (JP); Yukihiro Shimasaki, Hyogo (JP); Hiroki Takeoka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

This patent is subject to a terminal disclaimer.

(21) Appl. No.: 18/043,852

(22) PCT Filed: Sep. 2, 2021

(86) PCT No.: PCT/JP2021/032357
§ 371 (c)(1),
(2) Date: Mar. 2, 2023

(87) PCT Pub. No.: WO2022/054698
PCT Pub. Date: Mar. 17, 2022

(65) Prior Publication Data
US 2023/0326674 A1    Oct. 12, 2023

(30) Foreign Application Priority Data
Sep. 14, 2020    (JP) ................................. 2020-154057

(51) Int. Cl.
H01G 4/224    (2006.01)
H01G 4/012    (2006.01)
H01G 4/32    (2006.01)

(52) U.S. Cl.
CPC ............. *H01G 4/224* (2013.01); *H01G 4/012* (2013.01); *H01G 4/32* (2013.01)

(58) Field of Classification Search
CPC ........... H01G 4/32; H01G 4/224; H01G 4/012
(Continued)

(56) References Cited

U.S. PATENT DOCUMENTS

2006/0018080 A1*   1/2006   Schnetker .............. H01G 2/103
                                                    361/301.5
2010/0091425 A1*   4/2010   Takeoka ................. H01G 4/236
                                                    361/301.4

(Continued)

FOREIGN PATENT DOCUMENTS

JP        2006-294788 A      10/2006
JP        2007-277078 A      10/2007
(Continued)

OTHER PUBLICATIONS

International Search Report dated Nov. 22, 2021 issued in International Patent Application No. PCT/JP2021/032357, with English translation.
(Continued)

*Primary Examiner* — Arun Ramaswamy
(74) *Attorney, Agent, or Firm* — Rimon P.C.

(57)    ABSTRACT

An electronic component includes an electronic component element and a barrier layer encapsulating the electronic component element. The barrier layer includes a clay layer containing clay. The clay layer is provided to surround the electronic component element. The clay layer may reduce a quantity of water passing through the barrier layer. The barrier layer includes a resin layer containing a resin. The clay layer and the resin layer are preferably stacked one on top of the other. The resin layer is preferably thicker than the clay layer.

12 Claims, 9 Drawing Sheets

(58) Field of Classification Search
  USPC ............. 361/272, 301.5, 301.1, 306.1, 308.1
  See application file for complete search history.

(56)                     References Cited

U.S. PATENT DOCUMENTS

| | | | | |
|---|---|---|---|---|
| 2011/0032656 A1* | 2/2011 | Ito | .......................... | H01G 4/145 |
| | | | | 361/312 |
| 2013/0194712 A1* | 8/2013 | Lavene | .................... | H01G 4/28 |
| | | | | 361/274.1 |
| 2020/0294718 A1* | 9/2020 | Majima | ................. | H01G 4/005 |

FOREIGN PATENT DOCUMENTS

| | | | |
|---|---|---|---|
| JP | 2009-038135 | A | 2/2009 |
| JP | 2014-022508 | A | 2/2014 |
| JP | 2016-204592 | A | 12/2016 |
| JP | 2018-160498 | A | 10/2018 |
| JP | 2020-136518 | A | 8/2020 |
| WO | 2008/038808 | A1 | 4/2008 |
| WO | 2020/044778 | A1 | 3/2020 |

OTHER PUBLICATIONS

Notice of Reasons for Refusal dated Jul. 8, 2025 issued in the corresponding Japanese Patent Application No. 2022-547545, with English translation.

* cited by examiner

ELECTRONIC COMPONENT AND CAPACITOR

CROSS-REFERENCE OF RELATED APPLICATIONS

This application is the U.S. National Phase under 35 U.S.C. § 371 of International Patent Application No. PCT/JP2021/032357, filed on Sep. 2, 2021, which in turn claims the benefit of Japanese Patent Application No. 2020-154057, filed on Sep. 14, 2020, the entire disclosures of which Applications are incorporated by reference herein.

TECHNICAL FIELD

The present disclosure generally relates to an electronic component and a capacitor, and more particularly relates to an electronic component including an electronic component element and a barrier layer and a capacitor.

BACKGROUND ART

Patent Literature 1 discloses a case molded capacitor. The case molded capacitor includes a capacitor element, lead terminals, a molding resin, and a case. The capacitor element is a wound film capacitor element and is housed in a case made of polyphenylene sulfide (PPS). The molding resin fills the gap inside the case and encapsulates the capacitor element. The lead terminals are electrically connected to the capacitor element and extended out of the case through parts of the molding resin.

CITATION LIST

Patent Literature

Patent Literature 1: JP 2006-294788 A

SUMMARY OF INVENTION

The case molded capacitor of Patent Literature 1 attempts to shield the capacitor element from a humidity environment using the molding resin and the case. To ensure sufficient moisture resistance (or humidity resistance), however, the respective thicknesses of the case and the molding resin need to be increased, which requires a lot of resin. This makes it difficult to reduce the overall size of the capacitor.

It is therefore an object of the present disclosure to provide an electronic component and a capacitor, both of which may easily have their overall size reduced.

An electronic component according to an aspect of the present disclosure includes: an electronic component element; and a barrier layer encapsulating the electronic component element. The barrier layer includes a clay layer containing clay. The clay layer is provided to surround the electronic component element.

A capacitor according to another aspect of the present disclosure includes a capacitor element as the electronic component element of the electronic component described above.

BRIEF DESCRIPTION OF DRAWINGS

FIG. 4A is a perspective view illustrating a process step of a method for manufacturing a wound capacitor element;

FIG. 4B is a perspective view of the wound capacitor element;

FIGS. 6A and 6B are cross-sectional views illustrating a manufacturing process of the electronic component shown in FIGS. 1A-1C;

DESCRIPTION OF EMBODIMENTS

First Embodiment

(1) Overview

Figure 1:
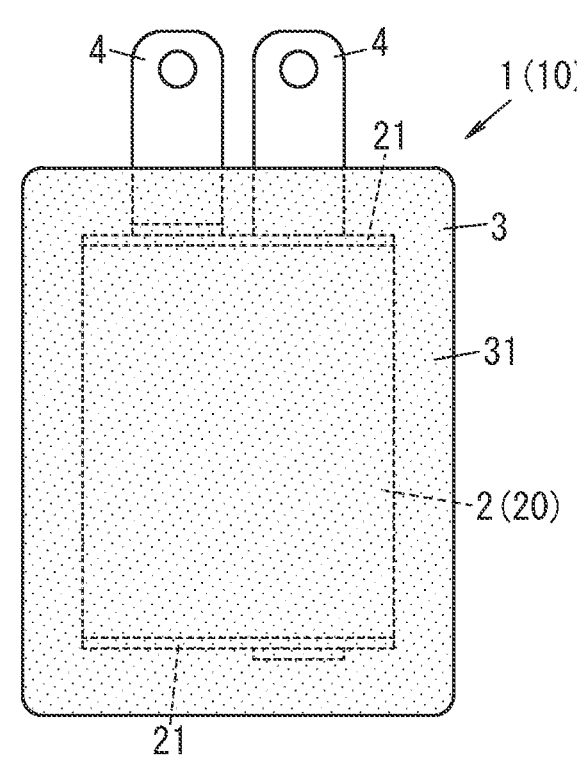
FIG. 1A is a front view illustrating an electronic component according to an exemplary embodiment of the present disclosure.
FIG. 1B is a cross-sectional view illustrating the electronic component according to the exemplary embodiment.
FIG. 1C is a cross-sectional view illustrating the electronic component according to the exemplary embodiment.
Figure 1:
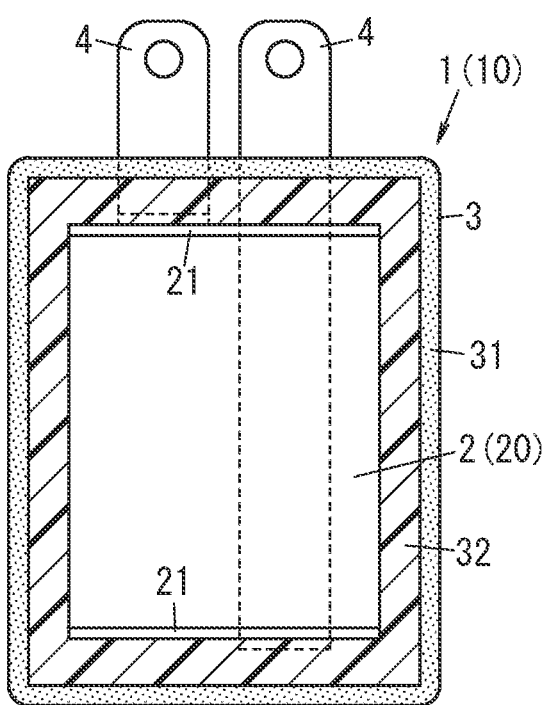
Figure 1:
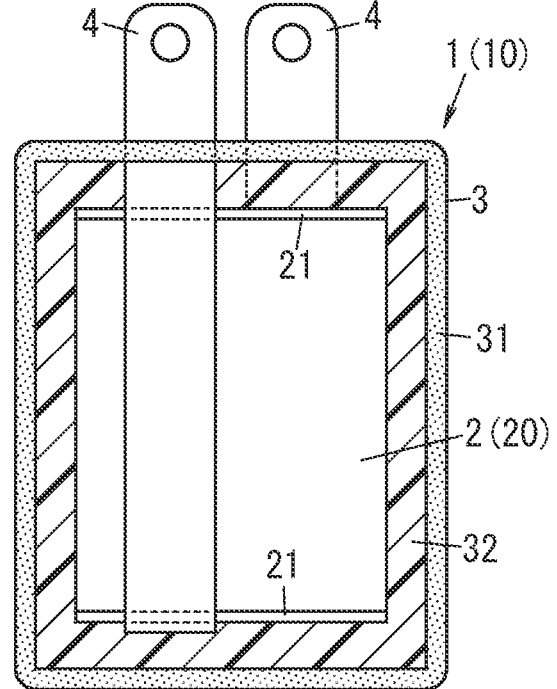
Figure 2:
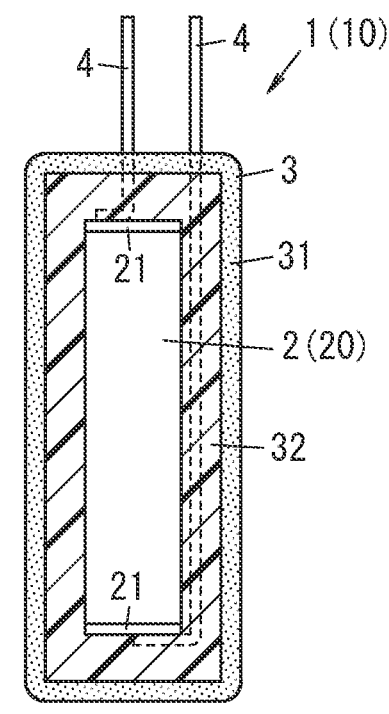
FIG. 2A is a cross-sectional view illustrating the electronic component according to the exemplary embodiment.
FIG. 2B is a cross-sectional view illustrating the electronic component according to the exemplary embodiment.
FIG. 2C is a cross-sectional view illustrating the electronic component according to the exemplary embodiment.
Figure 2:
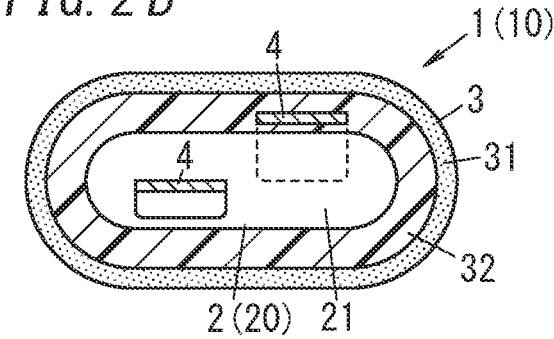
Figure 2:
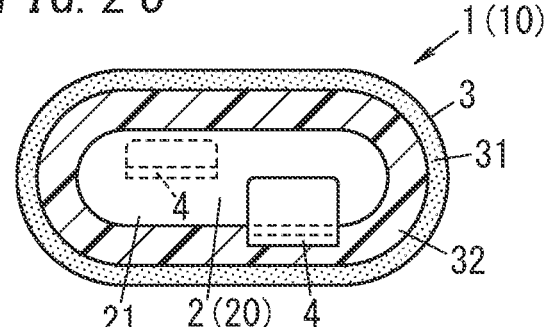

An electronic component 1 according to an exemplary embodiment includes an electronic component element 2 and a barrier layer 3 encapsulating the electronic component element 2 (refer to FIG. 1A). The barrier layer 3 includes a clay layer 31 containing clay. The clay layer 31 is provided to surround the electronic component element 2. In this configuration, the electronic component 1 includes, in a barrier layer 3, a clay layer 31 which allows water to permeate therethrough less smoothly than a layer consisting of a resin alone and having the same thickness as the barrier layer 3. That is to say, the clay layer 31 has a labyrinth structure, and therefore, allows a smaller quantity of water to permeate therethrough per unit thickness than a layer consisting of a resin alone and having the same thickness as the barrier layer 3. Thus, the barrier layer 3 including the clay layer 31 may reduce the permeation of water more significantly than a resin layer consisting of a resin alone (i.e., including no clay layer 31) and having the same thickness the barrier layer 3. This allows the electronic component 1 to contribute to downsizing more effectively by reducing the thickness of the barrier layer 3 while ensuring sufficient moisture resistance performance using the barrier layer 3.

For example, if the electronic component is a film capacitor, the electronic component element is implemented as a film capacitor element. The film capacitor element may be formed, for example, by forming a very thin evaporated electrode of aluminum (to a thickness of 20-30 nm) on a dielectric film first, winding two such dielectric films, each having the evaporated electrode, into a roll next, while shifting the two dielectric films from each other, and then forming external electrodes at both ends of the roll by Metallikon thermally spraying process.

The evaporated electrode of such a film capacitor element is too thin to exhibit sufficient moisture resistance (i.e., resistance to the water that has entered the film capacitor). Thus, such an evaporated electrode is sometimes oxidized by the water to have its electrode function affected and thereby cause deterioration in the characteristics of the film capacitor. That is why in the known art, the film capacitor element is shielded from water by being housed in a resin case and by filling the gap in the resin case with an encapsulation resin.

However, if only an epoxy resin is used for the resin case and as the encapsulation resin, even the thinnest part of the resin case and the encapsulation resin needs to be at least equal to 2 mm. Therefore, a film capacitor which uses such a resin case and encapsulation resin of an epoxy resin is so heavy that the manufacturing process thereof tends to be extremely complicated. In addition, if the film capacitor is designed as an onboard capacitor, its shape is custom designed and varies from one car model to another. Thus, the film capacitor is a product that makes it difficult to cut down its manufacturing cost.

In contrast, the electronic component 1 according to this embodiment includes the clay layer 31 containing clay in the barrier layer 3 that encapsulates the electronic component element 2, and therefore, makes it easier to reduce the quantity of water permeating through the barrier layer than a barrier layer made of a resin alone and having the same thickness as the former barrier layer. This reduces the quantity of water coming from outside of the electronic component 1 and reaching the electronic component element 2 and reduces the chances of the electronic component element 2 being affected by the water, thus making it easier to provide an electronic component 1 with excellent moisture resistance performance. In addition, the clay layer 31 may be formed by a simple means such as application, thus reducing the chances of making the manufacturing process of the electronic component 1 overly complicated and thereby making it easier to cut down the cost.

(2) Details

(2.1) Configuration

As shown in FIG. 1A, an electronic component 1 according to this embodiment includes an electronic component element 2 and a barrier layer 3 which encapsulates the electronic component element 2. The electronic component element 2 is a component or part that allows the electronic component 1 to perform its intended function. The barrier layer 3 has the capability of shielding the electronic component element 2. For example, the barrier layer 3 may have the capability of shielding the electronic component element 2 from water. Alternatively, the barrier layer 3 may also have the capability of shielding the electronic component element 2 from heat, light, electromagnetic wave, impact, or chemicals, for example. The barrier layer 3 is configured to covers the electronic component element 2 entirely but its parts, through which external connection terminals 4 are extended. In other words, the electronic component element 2 is covered and shielded entirely by the barrier layer 3 except its parts with the external connection terminals 4.

Next, a situation where the electronic component 1 is a capacitor 10 will be described. The electronic component 1 implemented as a capacitor 10 includes a capacitor element 20 as its electronic component element 2. That is to say, the electronic component element 2 included in the capacitor 10 is the capacitor element 20.

The external connection terminals 4 are terminals for electrically connecting the capacitor 10 to a circuit board, for example. One end portion (i.e., basal end portion) of each of the external connection terminals 4 is connected both electrically and mechanically to an external electrode 21 of the capacitor element 20. The other end portion (i.e., tip portion) of each of the external connection terminals 4 is located outside of the barrier layer 3. The external connection terminals 4 may be made of, for example, copper or a copper alloy and are formed in a plate shape. The capacitor 10 according to this embodiment includes a pair of external connection terminals 4 and the tip portion of each of the external connection terminals 4 protrudes from the same surface (e.g., an upper surface) of the barrier layer 3 to the outside (e.g., upward). Note that this shape and structure is only an example and should not be construed as limiting.

<Barrier Layer>

The barrier layer 3 has the capability of shielding the capacitor element 20 from water. Alternatively, the barrier layer 3 may also have the capability of shielding the capacitor element 20 from heat, light, electromagnetic wave, impact, or chemicals, for example. As shown in FIGS. 1B, 1C, 2A, 2B, and 2C, the barrier layer 3 is configured to covers the capacitor element 20 entirely but its parts, through which the external connection terminals 4 are extended. In other words, the capacitor element 20 is covered and shielded entirely by the barrier layer 3 but its parts with the external connection terminals 4.

<Clay Layer>

The barrier layer 3 includes a clay layer 31 containing clay. The clay layer 31 is formed in the shape of a layer including clay. As used herein, the "clay" refers to an aggregate of a plurality of mineral particles 311. In addition, in the clay, the aggregate of a plurality of mineral particles 311 may contain a small amount of water. The mineral particles 311 include at least one selected from the group consisting of mica, vermiculite, montmorillonite, iron montmorillonite, beidellite, saponite, hectorite, stevensite, and nontronite. Among other things, the mineral particles 311 preferably include montmorillonite, which is a clay material with high moisture resistance.

The crystal structure of montmorillonite uses, as a single-layer structure, an octahedron structure, which is centered around an Al (aluminum) atom, interposed between tetrahedron structures, each of which is centered around an Si (silicon) atom. Specifically, some trivalent Al atoms are replaced with divalent Mg or Fe atoms, thus making the single layer negatively charged. Therefore, for the purpose of charge compensation, hydrates of cations such as Na⁺ and Ca²⁺ are present in the crystal structure. When montmorillonite is dispersed in water, cation parts of montmorillonite are further hydrated and likely to be isolated on a single layer basis. Thus, it is easy to isolate montmorillonite into a single layer by dispersing montmorillonite in water. This makes it easier to have montmorillonite isolated into a single layer and contained in the clay layer 31 and form a labyrinth structure composed of mineral particles 311 in the clay layer 31.

In montmorillonite, interlayer exchangeable cations are easily exchangeable with other inorganic or organic cations. This enables giving montmorillonite affinity with an organic solvent and intercalate various compounds into interlayer sites thereof. In addition, a hydroxide is present at an end facet of the crystal, thus allowing montmorillonite to be decorated with any of various types of silylating agents. In addition, to impart high moisture resistance to the clay layer 31, it is preferable to make the clay layer 31 hydrophobic. For example, exchangeable cations (such as Na⁺) has high affinity with water. Thus, presence of such exchangeable cations at interlayer sites is often unbeneficial in making the clay layer 31 hydrophobic. Thus, the exchangeable cations may be replaced with Li and protons as an alternative measure. If montmorillonite is thermally treated, for example, ions will move to the inside and surface of the crystal, thus making it easier to make the clay layer 31 hydrophobic.

Figure 3:
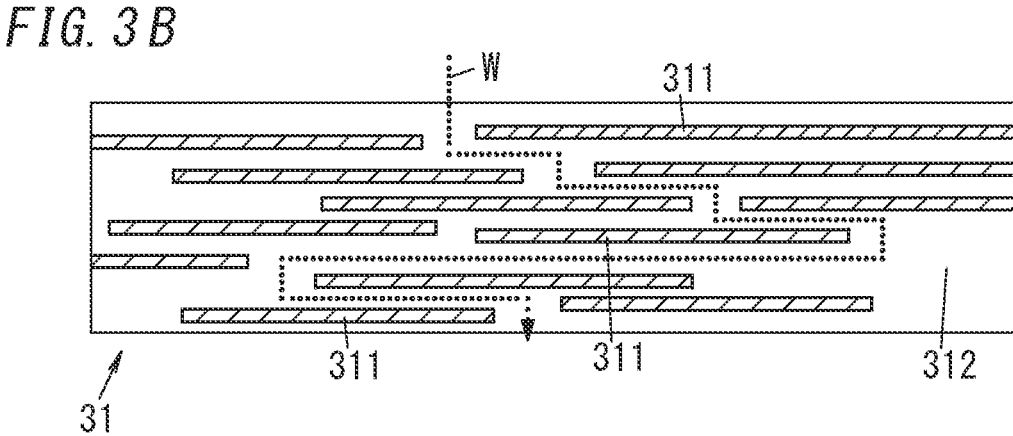
FIG. 3A is a schematic perspective view illustrating an exemplary mineral particle.
FIG. 3B is a schematic cross-sectional view illustrating an exemplary clay layer.

FIG. 3A is a schematic perspective view of a single mineral particle 311. In this embodiment, the mineral particle 311 is a plate-shaped or flake-shaped particle. That is to say, the mineral particle 311 is a particle, of which the thickness (a) is smaller than its lateral width (b). As used herein, the lateral width (b) refers to a dimension of the longest part of the mineral particle 311 in front view of the mineral particle 311 (i.e., when the mineral particle 311 is viewed from right in front of the mineral particle 311 in the thickness direction). If the mineral particle 311 has a disk shape, then its diameter is the lateral width (b) thereof. On the other hand, the thickness (a) refers to a dimension measured in a direction perpendicular to the lateral width (b) and is a dimension measured between two opposite surfaces of the mineral particle 311.

In this embodiment, the mineral particle 311 has a high aspect ratio. That is to say, the aspect ratio, which is defined to be the ratio of the lateral width (b) to the thickness (a), of the mineral particle 311 is high. The aspect ratio is determined by measuring the thickness (a) and lateral width (b) of the mineral particle 311. The thickness (a) is measured using a transmission electron microscope (TEM), for example. However, the same type of mineral particles 311 have a substantially uniform single-layer thickness. Thus, there is no need to measure the respective thicknesses a of a lot of mineral particles 311. For example, as for montmorillonite, its thickness (a) is about 1 nm. The lateral width (b) may be measured using, for example, an atomic force microscope (AFM). The dimension of its part which turns out to be the longest when a flat portion of the mineral particle 311 is observed is estimated to be the lateral width (b).

FIG. 3B is a schematic cross-sectional view of the clay layer 31. The clay layer 31 contains mineral particles 311 and a binder 312. That is to say, the clay layer 31 may be made up of the mineral particles 311 and the binder 312. Alternatively, the clay layer 31 may contain the mineral particles 311, the binder 312, and other additives. The binder 312 includes at least one selected from the group consisting of polypropylene, polyethylene sulfide, polyimide, polyamide, polyethylene terephthalate, epoxy resins, fluororesins, polyester resins, polyurethane resins, acrylic resins, phenoxy resins, polyacetal, and polyvinyl alcohol. Optionally, the binder 312 may also be a binder resin usable as a paint or a slurry varnish. Among other things, the binder 312 is preferably polyamide, polyimide, a polyurethane resin, an epoxy resin, or a phenoxy resin, considering how easy the binder 312 makes forming the clay layer 31 and the degree of adhesion of the binder 312 to the mineral particles 311. Optionally, a suitable curing agent (crosslinking agent) may also be used for the resin. In that case, the binder 312 is made of a crosslinked resin and the humidity resistance of the clay layer 31 may be improved.

The clay layer 31 is formed by dispersing the plurality of mineral particles 311 in the binder 312. The mineral particles 311 are dispersed to have their thickness substantially aligned with the thickness of the clay layer 31. A gap that would be left between a plurality of mineral particles 311, which are adjacent to each other in the thickness direction, is filled with the binder 312. A gap that would be left between a plurality of mineral particles 311, which are adjacent to each other in a direction perpendicular to the thickness direction, is also filled with the binder 312. As can be seen, the clay layer 31 has a structure like a labyrinth in which a passage is formed between a plurality of mineral particles 311 (i.e., has a labyrinth structure). That is to say, the plurality of mineral particles 311 are dispersed in the clay layer 31 to be located at random positions in the width direction while having their thickness aligned with the thickness of the clay layer 31. Thus, zigzag passages are formed between adjacent mineral particles 311. Therefore, water W passing through the clay layer 31 in the thickness direction cannot go straight but needs to go in zigzag through the gap between adjacent mineral particles 311 (as indicated by the dotted line in FIG. 3B). Thus, the clay layer 31 allows the water W to pass less smoothly therethrough than a resin layer including no mineral particles (i.e., a layer consisting of a binder alone), thus ensuring sufficient moisture resistance performance for the capacitor 10 even if the thickness of the barrier layer 3 is reduced. For example, even a clay layer 31 having a thickness falling within the range from a few μm to several ten μm allows the capacitor 10 to exhibit as high moisture resistance performance as a resin layer made of an epoxy resin alone and having a thickness of 2 mm. Thus, the capacitor 10 according to this embodiment may sometimes achieve moisture resistance performance that is 1,000 times or more as high as a barrier layer made of a resin alone does.

The labyrinth structure of the clay layer 31 is theoretically expressed by the following Equation (1):

$$P/P0 = (1-\Phi)/(1+0.5A\Phi) \qquad (1)$$

where P/P0 indicates specific permeability, $\Phi$ indicates the volume fraction of the mineral particles 311 in the clay layer 31, and A indicates the aspect ratio of the mineral particles 311.

The smaller the P/P0 value is, the less smoothly water passes through the clay layer 31. The larger the P/P0 value is, the more smoothly water passes through the clay layer 31. Thus, the larger the $\Phi$ value of Equation (1) is, the less smoothly water passes through the clay layer 31. The smaller the $\Phi$ value of Equation (1) is, the more smoothly water passes through the clay layer 31. Furthermore, the larger the A value of Equation (1) is, the less smoothly water passes through the clay layer 31. The smaller the A value of Equation (1) is, the more smoothly water passes through the clay layer 31. Therefore, to provide a barrier layer 3 that does not allow water to pass therethrough smoothly to improve the moisture resistance performance of the capacitor 10, the volume fraction of the mineral particles 311 with respect to the clay layer 31 is preferably increased. Alternatively or additionally, the content of the mineral particles 311 with a high aspect ratio is preferably increased.

The aspect ratio of the mineral particles 311 is preferably equal to or greater than 20. To provide the clay layer 31 that does not allow water to pass therethrough smoothly, mineral particles 311 having an even higher aspect ratio are preferably used. Taking other characteristics of the clay layer 31 (such as the mechanical strength, adhesion, and formability of the clay layer 31) into account, this range is preferred. The aspect ratio of the mineral particles 311 is more preferably equal to or greater than 100, and even more preferably equal to or greater than 150. The upper limit of the aspect ratio of the mineral particles 311 is not limited to any particular value but is set appropriately with the dispersibility of the mineral particles 311 in the clay layer 31 and other factors taken into account.

Optionally, a material with a high aspect ratio and a material with a low aspect ratio may be used in combination for the mineral particles 311. This makes it easier for the material with a low aspect ratio (i.e., mineral particles with a small diameter) to enter the gap between particles of the material with a high aspect ratio, thus enabling increasing the fillability of the mineral particles 311 in the clay layer 31. When the material with the high aspect ratio and the material with the low aspect ratio are used in combination, the material with the high aspect ratio preferably accounts for at least a half of the entire mass of the mineral particles 311 included in the clay layer 31.

The content of the mineral particles 311 in the clay layer 31 with respect to the entire mass of the clay layer 31 is preferably equal to or greater than 50% by mass. For example, if the clay layer 31 is made up of the mineral particles 311 and the binder 312, then the content of the mineral particles 311 is preferably equal to or greater than 50% by mass and equal to or less than 95% by mass with respect to the entire mass of the clay layer 31 and the content of the binder 312 is preferably equal to or greater than 5% by mass and equal to or less than 50% by mass with respect to the entire mass of the clay layer 31. This makes it easier to provide a clay layer 31 that does not allow water to pass smoothly therethrough while ensuring sufficient performance in terms of the mechanical strength, adhesion, formability, and other parameters of the clay layer 31.

The thickness of the clay layer 31 is preferably equal to or greater than 0.5 μm and equal to or less than 100 μm. To decrease the quantity of water permeating through the clay layer 31, the clay layer 31 is preferably as thick as possible. However, considering other characteristics such as the mechanical strength, adhesion, and formability of the clay layer 31, this range is preferred. The thickness of the clay layer 31 is more preferably equal to or greater than 0.5 μm and equal to or less than 50 μm and is even more preferably equal to or greater than 0.5 μm and equal to or less than 10 μm.

As shown in FIGS. 1B and 1C and FIGS. 2A-2C, the clay layer 31 is provided to surround the electronic component element 2. That is to say, the clay layer 31 is provided to surround the capacitor element 20. The clay layer 31 is preferably provided to surround the capacitor element 20 entirely but parts through which the external connection terminals 4 are extended. This reduces the chances of water entering the capacitor element 20 from the entire surroundings of the capacitor element 20, thus improving the moisture resistance performance of the capacitor 10. In particular, a peripheral surface of the capacitor element 20 (i.e., a surface around its axis) often has a larger area than end surfaces (i.e., the surfaces in the axial direction) thereof. Thus, it is preferable that the clay layer 31 be provided to surround at least the peripheral surface of the capacitor element 20. As described above, the clay layer 31 is formed to surround substantially entire surfaces of the capacitor element 20. As used herein, the phrase "substantially entire surfaces" refers to 80% or more of the overall surface area of the outer surfaces of the capacitor element 20 except the external electrodes 21 thereof.

Note that the clay layer 31 has not only low moisture permeability but also low gas permeability as well, thus making it easier for the barrier layer 3 to ensure sufficient gas barrier properties as well.

<Resin Layer>

The barrier layer 3 also includes a resin layer 32 containing a resin. That is to say, the barrier layer 3 is a composite material layer including both the clay layer 31 and the resin layer 32. Optionally, the barrier layer 3 may further include an additional layer besides the clay layer 31 and the resin layer 32. In addition, the clay layer 31 and the resin layer 32 are stacked one on top of the other. That is to say, the clay layer 31 and the resin layer 32 are arranged to face each other along the thickness of the barrier layer 3. Although the clay layer 31 and the resin layer 32 are stacked in contact with each other in this embodiment, the clay layer 31 and the resin layer 32 may also be stacked one on top of the other with an additional layer interposed between the clay layer 31 and the resin layer 32.

The resin layer 32 is preferably thicker than the clay layer 31. This makes it easier to protect the thin and easily crackable clay layer 31 with the resin layer 32. The thickness of the resin layer 32 is preferably equal to or greater than 1 mm and equal to or less than 6 mm. This allows the resin layer 32, as well as the clay layer 31, to decrease the moisture permeability of the barrier layer 3 more easily, thus improving the moisture resistance performance of the capacitor 10. The thickness of the resin layer 32 is more preferably equal to or greater than 1 mm and equal to or less than 4.5 mm and even more preferably equal to or greater than 1 mm and equal to or less than 3 mm.

As shown in FIGS. 1B and 1C and FIGS. 2A-2C, the resin layer 32 is located closer to the electronic component element 2 than the clay layer 31 is. That is to say, in the thickness direction defined for the barrier layer 3, the resin layer 32 is provided inside of the clay layer 31 (i.e., closer to the capacitor element 20) and the clay layer 31 is provide outside of the resin layer 32 (i.e., opposite from the capacitor element 20 with respect to the resin layer 32). As will be described later, the clay layer 31 is often formed by applying a paint including the mineral particles 311, the binder 312, and water. Thus, it is preferable to reduce the chances of the capacitor element 20 being affected by the water included in the paint for forming the clay layer 31. Therefore, providing the resin layer 32 closer to the capacitor element 20 than the clay layer 31 is reduces the chances of the water contained in the paint coming, when the clay layer 31 is formed, into contact with the capacitor element 20 due to the presence of the resin layer 32. This makes it easier to reduce the deterioration of the capacitor element 20 due to exposure to water. If the clay layer 31 is formed to surround the capacitor element 20 entirely but its parts with the external connection terminals 4, then the clay layer 31 is formed to cover the outer surfaces of the resin layer 32 entirely but its parts with the external connection terminals 4.

Examples of the resin contained in the resin layer 32 include epoxy-based resins, unsaturated polyester resins, and polyimide resins. Among other things, considering the moldability when the capacitor element 20 is encapsulated, an epoxy resin is preferred. Also, the resin layer 32 may be made of a resin alone. Alternatively, the resin layer 32 may also be made of a composite material including a resin and a filler. In that case, silica, for example, may be used as the filler. The content of the filler with respect to the entire mass of the resin layer 32 may be equal to or greater than 1% by mass and equal to or less than 99% by mass.

(2.2) Manufacturing Method

A method for manufacturing the capacitor 10 according to this embodiment includes an element forming step, a resin encapsulating (resin molding) step, and a clay layer forming step. The element forming step is the step of forming the capacitor element 20. The resin encapsulating step is the step of encapsulating, with the resin layer 32, the capacitor element 20 that has been formed in the element forming step. The clay layer forming step is the step of forming the clay layer 31 on the outer surfaces of the resin layer 32 that has been formed in the resin encapsulating step (i.e., surfaces opposite from the capacitor element 20).

Figures 4A, 4B:
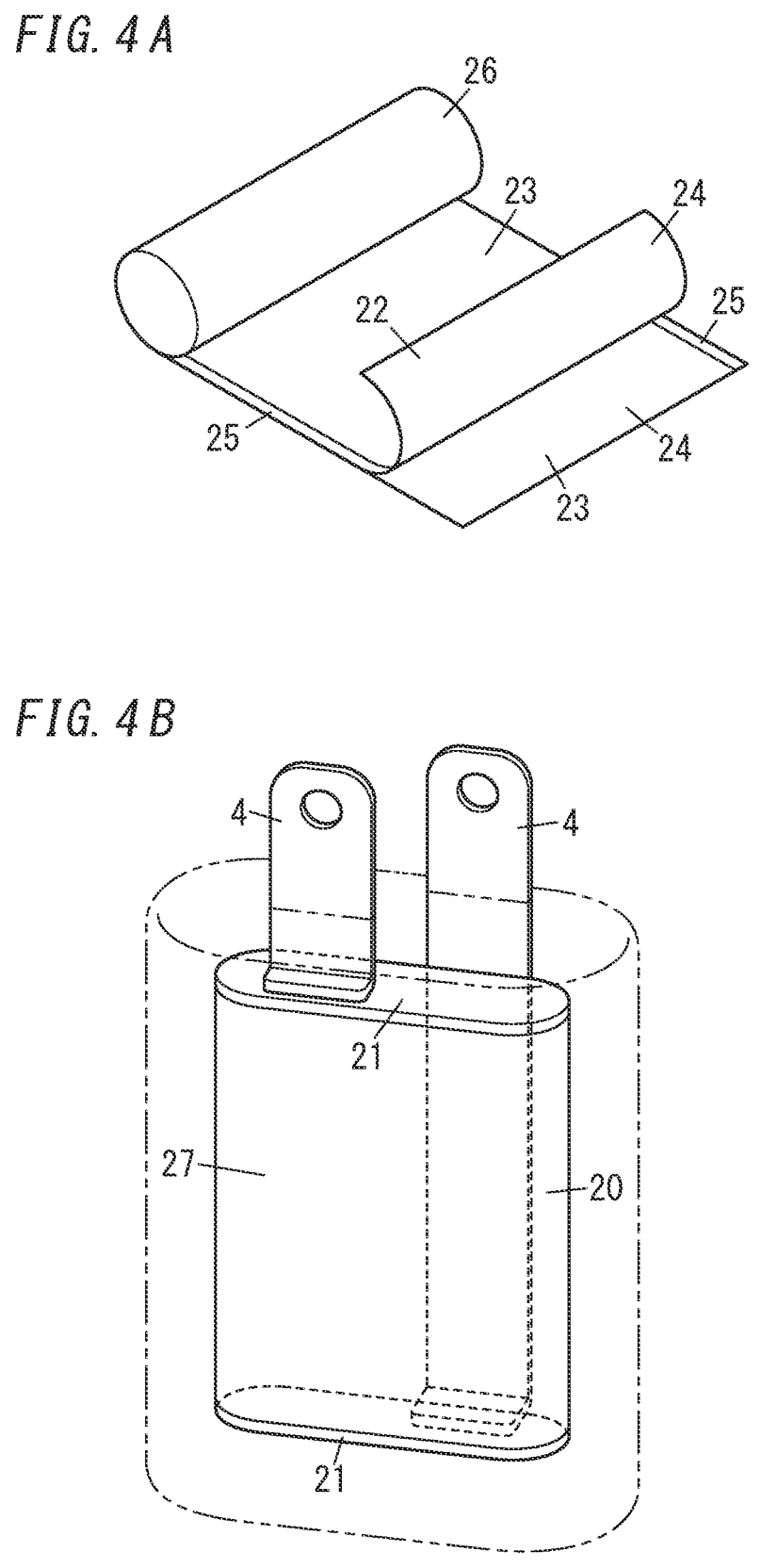

FIGS. 4A and 4B illustrate, as an exemplary element forming step, the step of forming a wound capacitor element 20. The wound capacitor element 20 includes a pair of metallized films 24, in each of which an electrode film 23 is formed on a dielectric film 22. The dielectric film 22 may be, for example, a resin film having electrical insulation properties and may be made of polypropylene, polyethylene terephthalate, polyethylene naphthalate, polyphenyl sulfide, or polystyrene, for example. The dielectric film 22 is a long film. The electrode film 23 is formed on one side of the dielectric film 22 except a margin portion 25. The margin portion 25 is a portion where the dielectric film 22 is exposed and is formed in the shape of a strip, of which the width is narrower than that of the electrode film 23, along one longer side of the dielectric film 22. The electrode film 23 is formed by a process such as an evaporation process or a sputtering process. The electrode film 23 may be made of, for example, aluminum, zinc, or magnesium.

Next, the pair of metallized films 24 are wound into a roll such that the electrode films 23 face each other with the dielectric film 22 interposed between themselves. At this time, the pair of metallized films 24 are laid one on top of the other with the two longer sides thereof aligned with each other as shown in FIG. 4A. In addition, the dielectric film 22 is interposed between one electrode film 23 and the other electrode film 23. Furthermore, the metallized films 24 are arranged such that the margin portions 25 on the respective longer sides of the pair of metallized films 24 are located on two opposite sides. A circular columnar roll 26 is obtained by winding up the pair of metallized films 24 that are laid one on top of the other in this manner. Next, this roll 26 is pressed from both side surfaces thereof and transformed into a roll 27 having an elliptical cross section (refer to FIG. 4B).

Next, an external electrode 21 is formed by Metallikon (metal thermal spraying) process at each of the two ends of the roll 27, thereby obtaining a wound capacitor element 20. Each external electrode 21 is electrically connected to an associated one of the electrode films 23. The pair of electrode films 23 forms a pair of internal electrodes. The external electrodes 21 are made of, for example, aluminum, zinc, magnesium, tin, or an alloy thereof. Thereafter, the external connection terminals 4 are electrically connected to the two external electrodes 21, respectively, as shown in FIG. 4B. Examples of the connection methods include solder welding, resistance welding, and ultrasonic welding.

On the other hand, a stacked capacitor element 20 may be manufactured in the following manner, for example. First, a plurality of metallized films 24 are provided (refer to FIG. 5A).

Each metallized film 24 includes the dielectric film 22 and the electrode film 23. The dielectric film 22 has a rectangular shape. The electrode film 23 is formed on one side of the dielectric film 22 except the margin portion 25. The margin portion 25 is formed in the shape of a strip, of which the width is narrower than that of the electrode film 23, along one side of the dielectric film 22. The dielectric film 22 and the electrode film 23 are made of the same material as in the wound capacitor element 20.

Figure 5A:
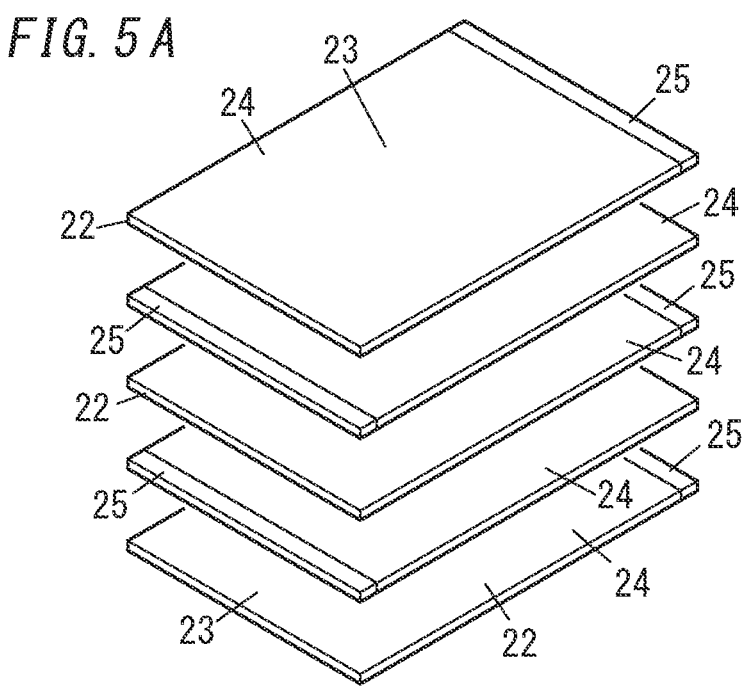
FIG. 5A is a perspective view illustrating a process step of a method for manufacturing a stacked capacitor element.

Next, as shown in FIG. 5A, the plurality of metallized films 24 are stacked one on top of another such that their four sides are aligned with each other. At this time, the dielectric film 22 is interposed between each pair of adjacent electrode films 23. In addition, in each pair of adjacent metallized films 24, one metallized film 24 is arranged to have its margin portion 25 disposed at the rear and the other metallized film 24 is arranged to have its margin portion 25 disposed at the front. A multi-layer stack 28 such as the ones shown in FIGS. 5B and 5C may be obtained by stacking the plurality of metallized films 24 one on top of another and integrating the metallized films 24 together. This multi-layer stack 28 is covered with a protective film 29 entirely but the front and rear surfaces thereof. The protective film 29 is a film with electrical insulation properties.

Figure 5B:
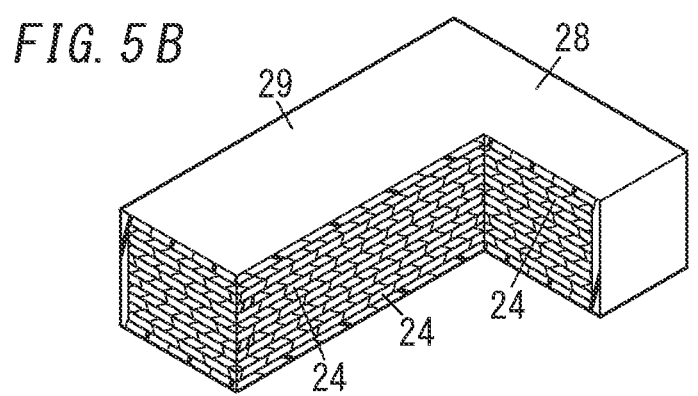
FIG. 5B is a partially cutaway perspective view of the stacked capacitor element.
Figure 5C:
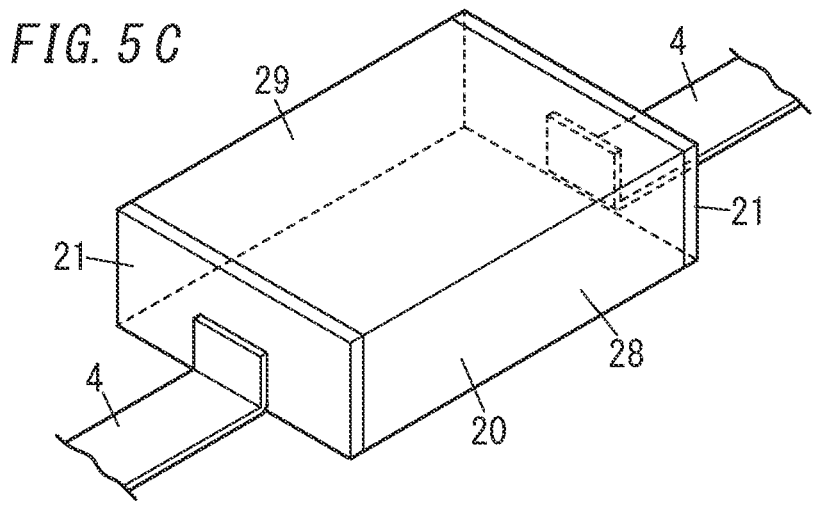
FIG. 5C is a perspective view of the stacked capacitor element.

Next, an external electrode 21 is formed by Metallikon (metal thermal spraying) process on each of the front and rear surfaces of the multi-layer stack 28, thereby obtaining a stacked capacitor element 20. Each external electrode 21 is electrically connected to the respective electrode films 23. A pair of electrode films 23 forms a pair of internal electrodes. The external electrodes 21 are made of, for example, aluminum, zinc, magnesium, tin, or an alloy thereof. Thereafter, the external connection terminals 4 are electrically connected to the two external electrodes 21, respectively, as shown in FIG. 5B. Examples of the connection methods include solder welding, resistance welding, and ultrasonic welding.

Figures 6A, 6B:
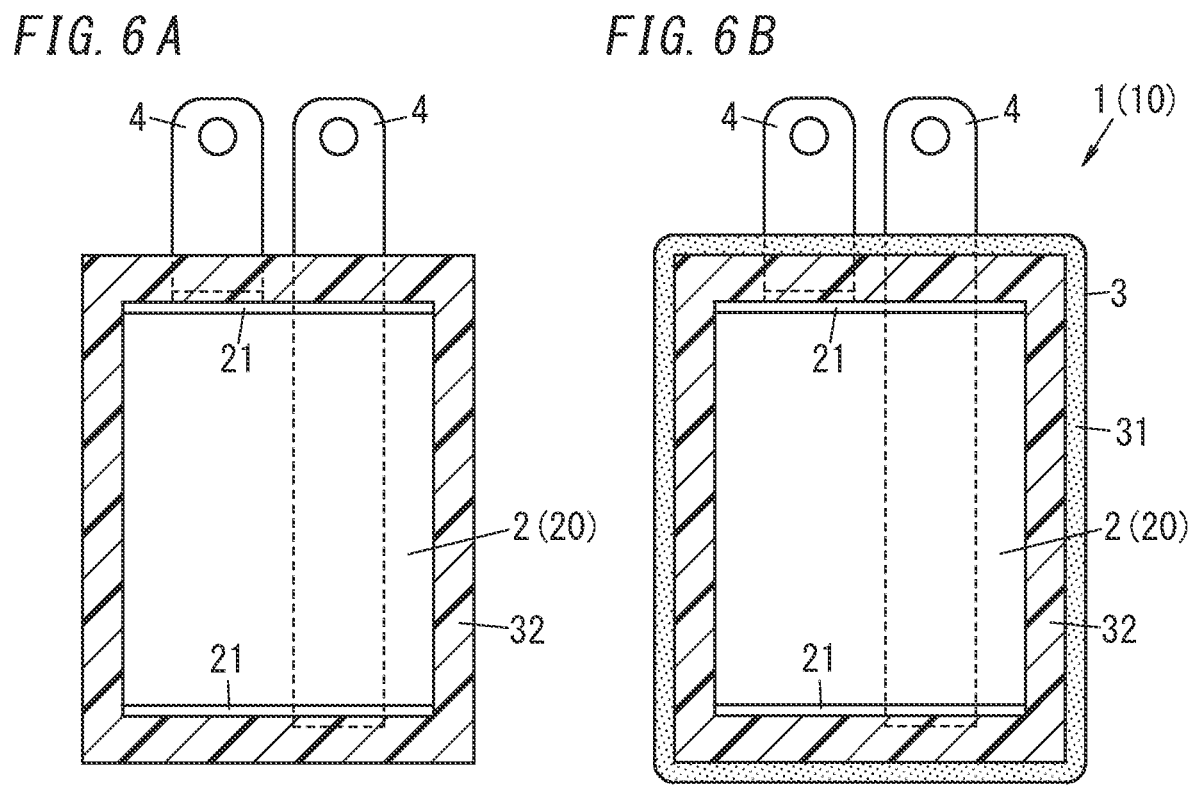

After the element forming step has been performed, the resin encapsulating step is performed. The resin encapsulating step includes encapsulating, with a resin, the capacitor element 20 that has been formed in the element forming step to form the resin layer 32 (refer to FIG. 6A). Examples of the resin include epoxy resins, unsaturated polyester resins, polyimide resins, urethane resins, and silicone resins. Examples of molding methods when the capacitor element 20 is encapsulated include transfer molding, compression, and laminate molding. Optionally, the capacitor element 20 may be housed in a case having the resin layer 32 and encapsulated. The resin layer 32 is formed to cover capacitor element 20 entirely but connection portions between the capacitor element 20 and the external connection terminals 4. The tip of each of the external connection terminals 4 is located outside of the resin layer 32 (i.e., opposite from the capacitor element 20).

After the resin encapsulating step has been performed, the clay layer forming step is performed. The clay layer forming step includes forming a clay layer 31 on the resin layer 32 that has been formed in the resin encapsulating step (refer to FIG. 6B). The clay layer 31 is formed by supplying, onto the surface of the resin layer 32, a treatment liquid containing the mineral particles 311 and the binder 312 and drying the treatment liquid on the surface of the resin layer 32. In the treatment liquid, the mineral particles 311 and the binder 312 are dispersed in a solvent. As the solvent, water, an organic solvent, or a mixed solvent thereof may be used. Considering its handleability at the time of a waste disposal process, the solvent is preferably water. When the treatment liquid is supplied onto the surface of the resin layer 32, a painting technique such as brush painting or spray painting or an immersion technique such as dipping may be adopted. This makes it easier to supply, even if the surface of the resin layer 32 has some unevenness, the treatment liquid accordingly, thus making it easier to form the clay layer 31. The treatment liquid is supplied to surround the capacitor element 20. It is preferable to supply the treatment liquid onto the entire outer surfaces of the resin layer 32 but its parts with the external connection terminals 4, for example. The treatment liquid may be dried by either natural drying or heating drying, for example.

This manufacturing method enables forming a clay layer which may exhibit excellent moisture resistance in spite of its small thickness (on the order of a few μm to several ten μm), ensuring sufficient moisture resistance performance for the barrier layer 3 even if the thickness of the resin layer 32 is reduced, and contributing to reducing the size and weight of the capacitor 10 by providing a thinner resin layer 32.

(3) Variations

Note that the first embodiment described above is only an exemplary one of various embodiments of the present disclosure and should not be construed as limiting. Rather, the first exemplary embodiment may be readily modified in various manners depending on a design choice or any other factor without departing from the scope of the present disclosure.

In the foregoing description, the electronic component is supposed to be a capacitor. However, this is only an example and should not be construed as limiting. Alternatively, the present disclosure is also applicable to even a situation where the electronic component is a passive or active component other than the capacitor. The passive component other than the capacitor includes, instead of the capacitor element, a passive element selected according to the type of the electronic component. The active component other than the capacitor includes, instead of the capacitor element, an active element selected according to the type of the electronic component.

In the foregoing description, the capacitor is supposed to be a film capacitor. However, this is only an example and should not be construed as limiting. Rather, the present disclosure is also applicable to a capacitor other than the film capacitor. For example, the capacitor may also be a solid electrolytic capacitor. In that case, the capacitor element has a solid electrolyte.

Second Embodiment

An electronic component 1 according to a second embodiment is different from the electronic component 1 according to the first embodiment in the configuration of the barrier layer 3.

In the following description, any constituent element of this second embodiment, having the same function as a counterpart of the first embodiment described above, will be designated by the same reference numeral as that counterpart's, and description thereof will be omitted as appropriate herein.

Note that a configuration to be described below for the second embodiment may be adopted as appropriate in combination with the configuration described for the first embodiment (including variations thereof).

Figure 7A:
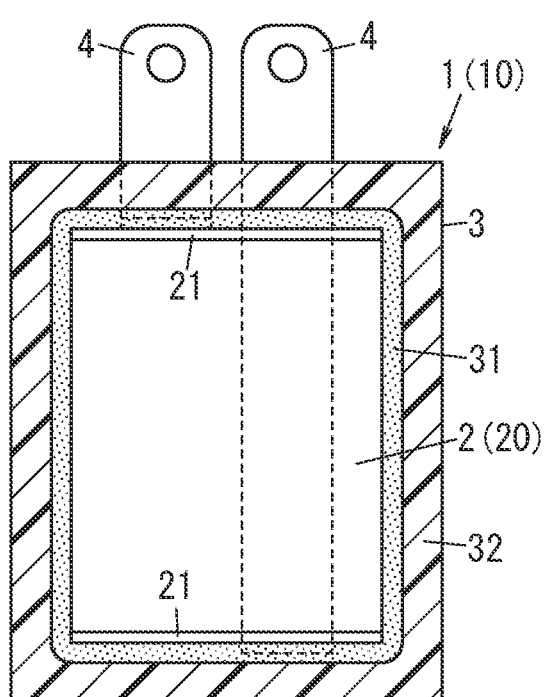
FIG. 7A is a cross-sectional view illustrating an electronic component according to a second embodiment of the present disclosure.
Figure 7B:
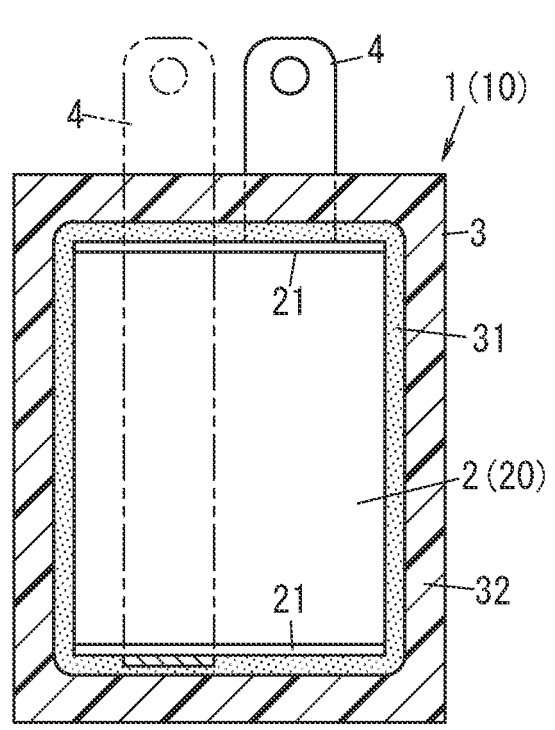
FIG. 7B is a cross-sectional view illustrating the electronic component according to the second embodiment.
Figure 7C:
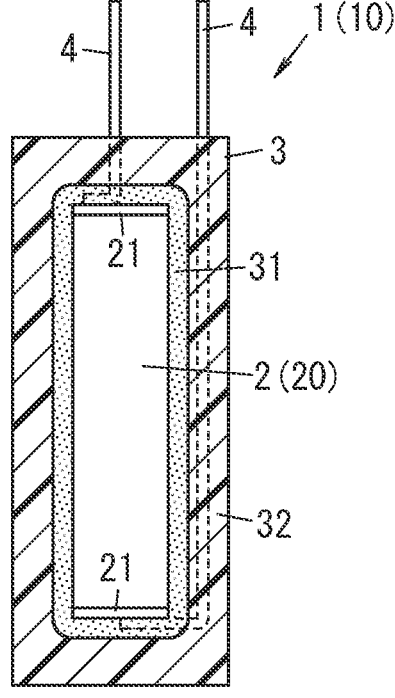
FIG. 7C is a cross-sectional view illustrating the electronic component according to the second embodiment.

FIGS. 7A-7C illustrate a capacitor 10 as an exemplary electronic component 1 according to the second embodiment. In this capacitor 10, the barrier layer 3 also includes the clay layer 31 and the resin layer 32 but the clay layer 31 is not provided on the outer surfaces of the resin layer 32. Instead, the clay layer 31 is provided on the inner surfaces (i.e., the surfaces facing toward the capacitor element 20) of the resin layer 32. That is to say, the clay layer 31 is located between the resin layer 32 and the capacitor element 20. Therefore, in the thickness direction defined for the barrier layer 3, the clay layer 31 is located closer to the electronic component element 2 (capacitor element 20) than the resin layer 32 is.

The clay layer 31 covers the outer surfaces of the electronic component element 2 (capacitor element 20) entirely but parts of the external electrodes 21. That is to say, the clay layer 31 is formed not only on either the peripheral surface of the roll 27 of the capacitor element 20 or on the surface of the protective film 29 but also on the outer surfaces of the external electrodes 21 as well. In this case, the outer surfaces of the external electrodes 21 include connection portions where the external electrodes 21 are connected to the external connection terminals 4, and therefore, the clay layer 31 is not formed on those connection portions of the outer surfaces of the external electrodes 21.

Figures 8A, 8B, 8C:
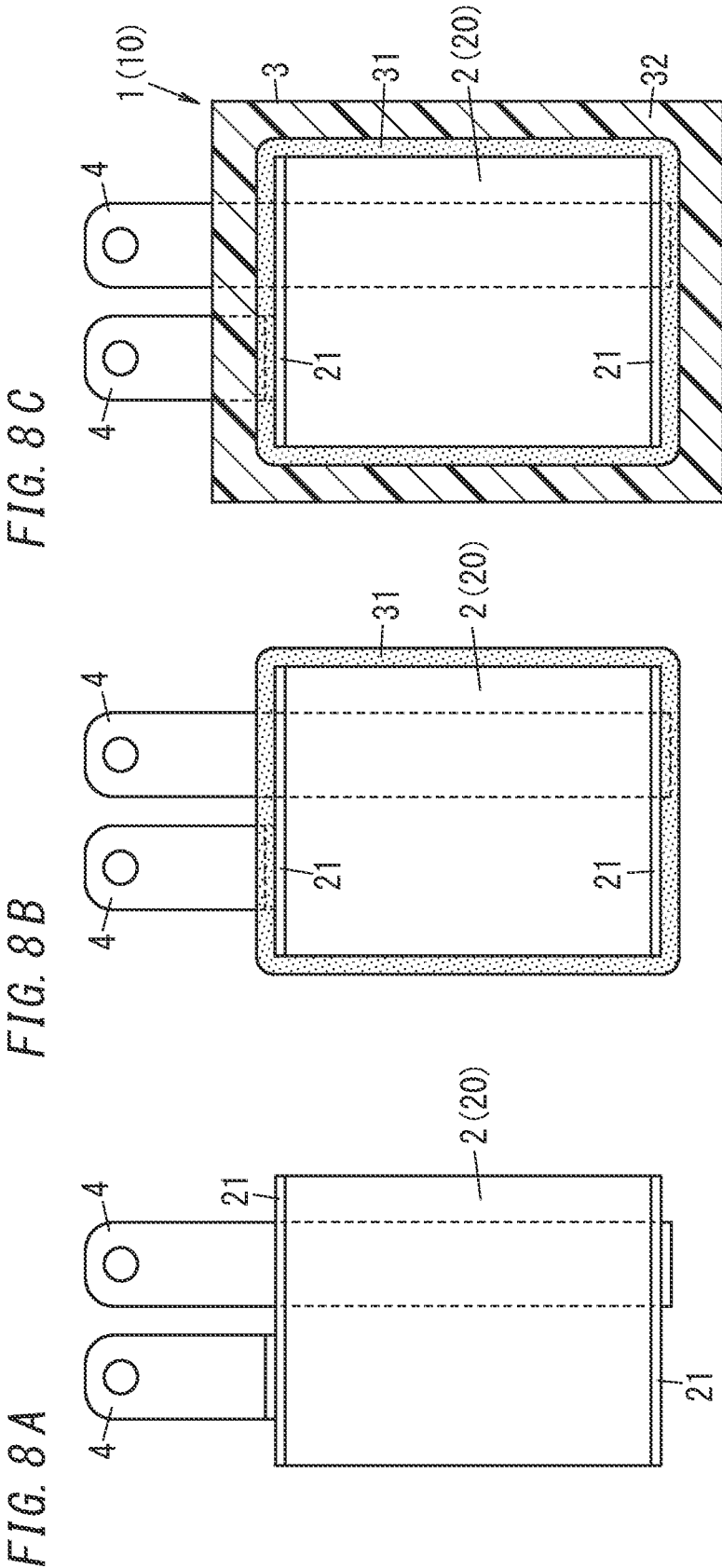
FIGS. 8A-8C are cross-sectional views illustrating a manufacturing process of the electronic component shown in FIGS. 7A-7C.

To form such a capacitor 10, first, a capacitor element 20 is formed by performing the element forming step in the same way as described above, and external connection terminals 4 are connected to the external electrodes 21 both electrically and mechanically by soldering, for example (refer to FIG. 8A). Next, in the clay layer forming step, a treatment liquid containing the mineral particles 311 and the binder 312 is supplied onto the outer surfaces of the capacitor element 20 and dried, thereby forming a clay layer 31 to surround the capacitor element 20 (refer to FIG. 8B). Thereafter, in the resin encapsulating step, a resin layer 32 is formed on the outer surfaces of the clay layer 31, thereby enabling encapsulating the capacitor element 20 with a barrier layer 3 in which the clay layer 31 and the resin layer 32 are stacked one on top of the other.

This capacitor 10 includes the resin layer 32 outside of the clay layer 31. Thus, the resin layer 32 may prevent the thin clay layer 31 from being mechanically damaged under external force, thus reducing the chances of causing a decline in the moisture resistance reliability of the capacitor 10.

Third Embodiment

An electronic component 1 according to a third embodiment is different from the electronic component 1 according to the first or second embodiment in the configuration of the barrier layer 3.

In the following description, any constituent element of this third embodiment, having the same function as a counterpart of the first or second embodiment described above, will be designated by the same reference numeral as that counterpart's, and description thereof will be omitted as appropriate herein.

Note that a configuration to be described below for the third embodiment may be adopted as appropriate in combination with the configuration described for the first or second embodiment (including variations thereof).

Figures 9A, 9B, 9C:
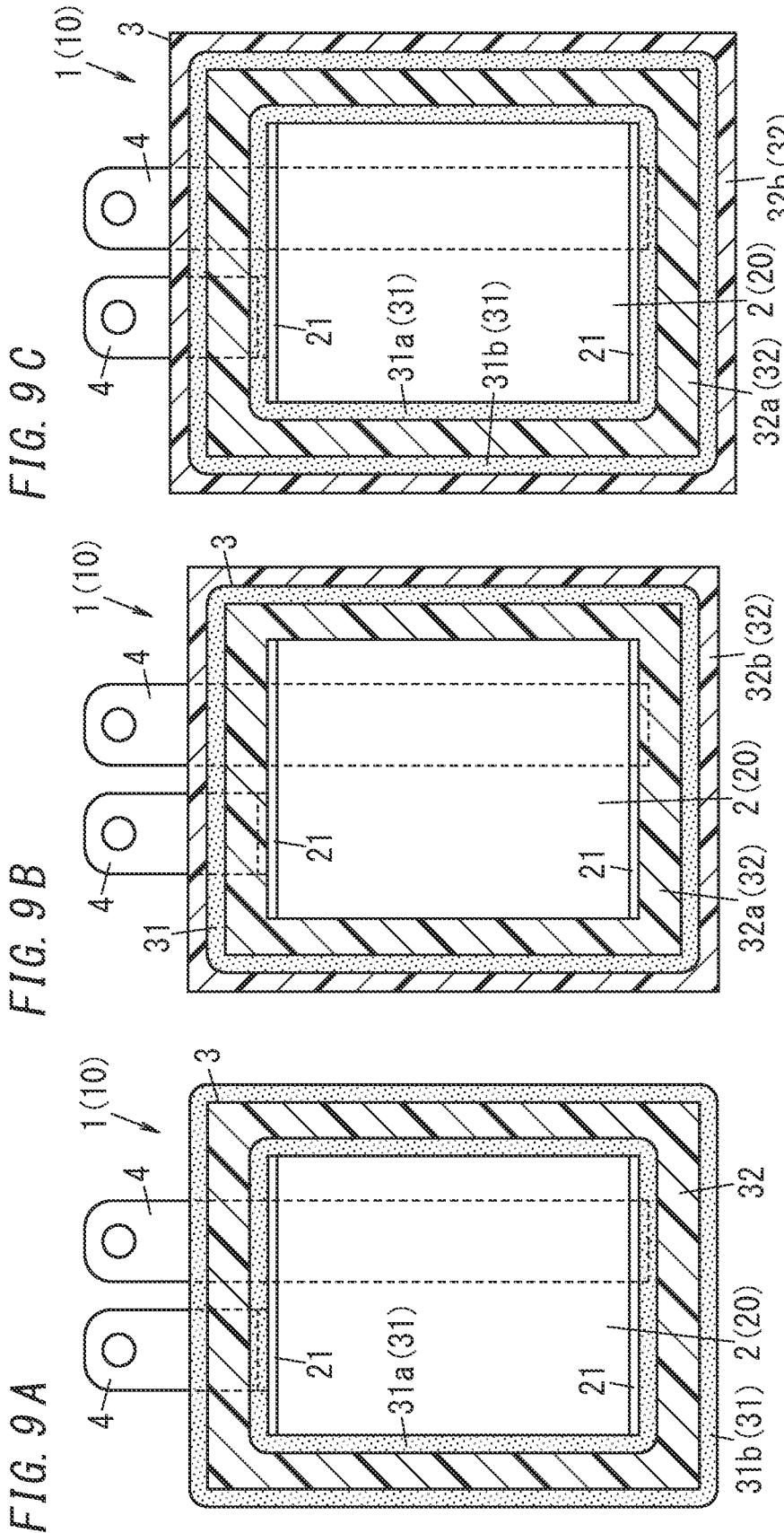
FIG. 9A is a cross-sectional view illustrating an electronic component according to a third embodiment of the present disclosure.
FIG. 9B is a cross-sectional view illustrating an electronic component according to a fourth embodiment of the present disclosure.
FIG. 9C is a cross-sectional view illustrating an electronic component according to a fifth embodiment of the present disclosure.

FIG. 9A illustrates a capacitor 10 as an electronic component 1 according to a third embodiment. This capacitor 10 includes not only every constituent element of the capacitor 10 according to the second embodiment described above but also an additional clay layer 31 provided on the outer surfaces of the resin layer 32. That is to say, the barrier layer 3 includes, as the clay layers 31, a first clay layer 31a and a second clay layer 31b. The first clay layer 31a, as well as the clay layer 31 according to the second embodiment, is formed to surround the capacitor element 20. Likewise, the resin layer 32, as well as the resin layer 32 according to the second embodiment, is also formed to cover the first clay layer 31a. Furthermore, the second clay layer 31b is formed on the outer surfaces of the resin layer 32 to surround the capacitor element 20 entirely. As can be seen, the barrier layer 3 has a structure in which the first clay layer 31a, the resin layer 32, and the second clay layer 31b are stacked one on top of another in the thickness direction defined for the barrier layer 3 as viewed from the capacitor element 20.

This capacitor 10 encapsulates the capacitor element 20 with the barrier layer 3 including two clay layers 31, thus further reducing the passage of water through the barrier layer 3 in the thickness direction and further reducing the chances of causing a decline in the moisture resistance reliability of the capacitor 10, compared to the capacitor 10 according to the first embodiment including a single clay layer 31.

Fourth Embodiment

An electronic component 1 according to a fourth embodiment is different from the electronic component 1 according to the first, second or third embodiment in the configuration of the barrier layer 3.

In the following description, any constituent element of this fourth embodiment, having the same function as a counterpart of the first, second, or third embodiment described above, will be designated by the same reference numeral as that counterpart's, and description thereof will be omitted as appropriate herein.

Note that a configuration to be described below for the fourth embodiment may be adopted as appropriate in combination with the configuration described for the first, second, or third embodiment (including variations thereof).

FIG. 9B illustrates a capacitor 10 as an electronic component 1 according to a fourth embodiment. This capacitor 10 includes not only every constituent element of the capacitor 10 according to the first embodiment described above but also an additional resin layer 32 provided on the outer surfaces of the clay layer 31. That is to say, the barrier layer 3 includes, as the resin layers 32, a first resin layer 32a and a second resin layer 32b. The first resin layer 32a, as well as the resin layer 32 according to the first embodiment, is formed to encapsulate the capacitor element 20. The clay layer 31, as well as the clay layer 31 according to the first embodiment, is also formed to cover the first resin layer 32a. Furthermore, the second resin layer 32b is formed on the outer surfaces of the clay layer 31 to surround the capacitor element 20 entirely. As can be seen, the barrier layer 3 has a structure in which the first resin layer 32a, the clay layer 31, and the second resin layer 32b are stacked one on top of another in the thickness direction defined for the barrier layer 3 as viewed from the capacitor element 20.

This capacitor 10 encapsulates the capacitor element 20 with the barrier layer 3 including the two resin layers 32. Thus, providing the clay layer 31 between the two resin layers 32 allows the resin layers 32 to prevent the thin clay layer 31 from being mechanically damaged under external force, thus reducing the chances of causing a decline in the moisture resistance reliability of the capacitor 10.

Fifth Embodiment

An electronic component 1 according to a fifth embodiment is different from the electronic component 1 according to the first, second, third, or fourth embodiment in the configuration of the barrier layer 3.

In the following description, any constituent element of this fifth embodiment, having the same function as a counterpart of the first, second, third, or fourth embodiment described above, will be designated by the same reference numeral as that counterpart's, and description thereof will be omitted as appropriate herein.

Note that a configuration to be described below for the fifth embodiment may be adopted as appropriate in combination with the configuration described for the first, second, third, or fourth embodiment (including variations thereof).

FIG. 9C illustrates a capacitor 10 as an electronic component 1 according to a fifth embodiment. This capacitor 10 includes not only every constituent element of the capacitor 10 according to the third embodiment described above but also a second resin layer 32b provided on the outer surfaces of the second clay layer. That is to say, the barrier layer 3 includes, as the clay layers 31, the first clay layer 31a and the second clay layer 31b. In addition, the barrier layer 3 includes, as the resin layers 32, a first resin layer 32a and the second resin layer 32b. The first clay layer 31a, as well as the clay layer 31 according to the third embodiment, is formed to surround the capacitor element 20. Likewise, the first resin layer 32a, as well as the resin layer 32 according to the third embodiment, is also formed to cover the first clay layer 31a. Furthermore, the second clay layer 31b is formed on the outer surfaces of the first resin layer 32a to surround the capacitor element 20 entirely. Furthermore, the second resin layer 32b is formed to cover the second clay layer 31b. As can be seen, the barrier layer 3 has a structure in which the first clay layer 31a, the first resin layer 32a, the second clay layer 31b, and the second resin layer 32b are stacked one on top of another in the thickness direction defined for the barrier layer 3 as viewed from the capacitor element 20.

This capacitor 10 encapsulates the capacitor element 20 with the barrier layer 3 in which the two clay layers 31 and the two resin layers 32 are alternately stacked one on top of another. Thus, this capacitor 10 further reduces the chances of water passing through the barrier layer 3 compared to the capacitor 10 according to the first embodiment including a single clay layer 31. In addition, this capacitor 10 also allows the two resin layers 32 to protect the two clay layers, thus further reducing the chances of causing a decline in the moisture resistance reliability of the capacitor 10.
(Recapitulation)

The electronic components (1) according to the exemplary embodiments described above are specific implementations of the following aspects of the present disclosure.

An electronic component (1) according to a first aspect includes: an electronic component element (2); and a barrier layer (3) encapsulating the electronic component element (2). The barrier layer (3) includes a clay layer (31) containing clay. The clay layer (31) is provided to surround the electronic component element (2).

This aspect may reduce, using the clay layer (31), the permeation of water and gases into the electronic component element (2) from outside of the electronic component element (2), thus achieving the advantage of providing an electronic component, of which the performance is hardly affected by a variation in its electrostatic capacitance due to moisture absorption, for example.

In an electronic component (1) according to a second aspect, which may be implemented in conjunction with the first aspect, the barrier layer (3) includes a resin layer (32) containing a resin. The clay layer (31) and the resin layer (32) are stacked one on top of the other.

According to this aspect, stacking the clay layer (31) with excellent barrier ability and the resin layer (32) with high mechanical strength one on top of the other enables reducing damage done to the clay layer (31) under external force, thus achieving the advantage of forming a barrier layer (3) with high moisture resistance reliability.

In an electronic component (1) according to a third aspect, which may be implemented in conjunction with the second aspect, the resin layer (32) is thicker than the clay layer (31).

In general, the clay layer (31) exhibits excellent moisture permeation resistance even when formed as a thin layer but is so hard and brittle as to be damaged easily upon application of external force such as impact thereto. In addition, it is also difficult to form a thick clay layer (31) from the viewpoint of productivity. On the other hand, the resin layer (32) has lower moisture permeation resistance than the clay layer (31) but may be easily formed thick enough to absorb external force such as impact. Thus, according to this aspect, stacking a thick resin layer (32) on the clay layer (31) to support the clay layer (31) enables achieving the advantage of effectively reducing mechanical damage done to the clay layer (31).

In an electronic component (1) according to a fourth aspect, which may be implemented in conjunction with the second or third aspect, the clay layer (31) is located closer to the electronic component element (2) than the resin layer (32) is.

This aspect allows the resin layer (32) to prevent the thin clay layer (31) from being damaged mechanically under external force, thus achieving the advantage of providing an electronic component (1) with high moisture resistance reliability.

In an electronic component (1) according to a fifth aspect, which may be implemented in conjunction with the second or third aspect, the resin layer (32) is located closer to the electronic component element (2) than the clay layer (31) is.

According to this aspect, providing the clay layer (31) enables reducing the thickness of the resin layer (32), thus achieving the advantage of enabling downsizing. From the viewpoint of ensuring moisture resistance and versatility of shape, a film capacitor is often resin molded. This aspect achieves the advantage of forming the clay layer (31) in an additional process step without changing the known structure or manufacturing process.

In an electronic component (1) according to a sixth aspect, which may be implemented in conjunction with any one of the first to fifth aspects, the clay layer (31) contains mineral particles (311) and a binder (312). The mineral particles (311) include either plate-shaped particles or flake-shaped particles.

This aspect achieves the advantage of enabling forming, using mineral particles (311) with a high aspect ratio, a clay layer (31) having excellent moisture permeation resistance.

In an electronic component (1) according to a seventh aspect, which may be implemented in conjunction with the sixth aspect, the mineral particles (311) include at least one selected from the group consisting of mica, vermiculite, montmorillonite, iron montmorillonite, beidellite, saponite, hectorite, stevensite, and nontronite.

This aspect achieves the advantage of enabling forming a clay layer having excellent moisture permeation resistance.

In an electronic component (1) according to an eighth aspect, which may be implemented in conjunction with the sixth or seventh aspect, the binder (312) includes at least one selected from the group consisting of polypropylene, polyethylene sulfide, polyimide, polyamide, polyethylene terephthalate, epoxy resins, fluororesins, polyester resins, polyurethane resins, acrylic resins, phenoxy resins, polyacetal, and polyvinyl alcohol.

This aspect achieves the advantage of enabling forming a clay layer (31) having excellent moisture permeation resistance by filling the gap between the mineral particles (311) with the binder (312).

In an electronic component (1) according to a ninth aspect, which may be implemented in conjunction with any one of the first to eighth aspects, content of the mineral particles (311) in the clay layer (31) is equal to or greater than 50% by mass with respect to an entire mass of the clay layer (31).

This aspect achieves the advantage of enabling forming a clay layer (31) having excellent moisture permeation resistance.

In an electronic component (1) according to a tenth aspect, which may be implemented in conjunction with any one of the first to ninth aspects, the clay layer (31) covers outer surfaces of the electronic component element (2) entirely but a part of an external electrode (21) of the electronic component element (2).

This aspect achieves the advantage of reducing the chances of the clay layer (31) decreasing the moisture resistance reliability of the barrier layer (3).

In a capacitor (10) according to an eleventh aspect, the electronic component (1) according to any one of the first to tenth aspects includes a capacitor element (20) as the electronic component element (2) thereof.

This aspect achieves the advantage of providing a capacitor (10), of which the electrostatic capacitance hardly varies due to moisture permeation.

In a capacitor (10) according to a twelfth aspect, which may be implemented in conjunction with the eleventh aspect, the capacitor element (20) includes a pair of metallized films (24), in each of which an electrode film (23) is formed on a dielectric film (22). The pair of metallized films (24) are wound into a roll to make the electrode films (23) face each other with the dielectric film (22) interposed between the electrode films (23).

In general, when absorbing moisture, a film capacitor may come to have decreased electrostatic capacitance due to oxidation of an Al electrode being electrified. Meanwhile, this aspect achieves the advantage of reducing the chances of causing a decrease in electrostatic capacitance.

REFERENCE SIGNS LIST

1 Electronic Component
10 Capacitor
2 Electronic Component Element
20 Capacitor Element
21 External Electrode
22 Dielectric Film
23 Electrode Film
24 Metallized Film

3 Barrier Layer
31 Clay Layer
311 Mineral Particle
312 Binder
32 Resin Layer

The invention claimed is:

1. A capacitor comprising:

a capacitor element including an external electrode;

an external connection terminal connected to the external electrode; and a barrier layer encapsulating the capacitor element such that the external connection terminal protrudes from the barrier layer, wherein:

the barrier layer includes a clay layer formed of a coating film containing mineral particles and a binder, and a resin layer containing resin, the clay layer and the resin layer are stacked one on top of the other, the clay layer is located closer to the capacitor element than the resin layer is, and is provided on a peripheral surface of the capacitor element, and on the external electrode, and the clay layer covers all of outer surfaces of the capacitor element except for a part with which the external connection terminal is connected.

2. The capacitor of claim 1, wherein the resin layer is thicker than the clay layer.

3. The capacitor of claim 1, wherein the mineral particles include either plate-shaped particles or flake-shaped particles.

4. The capacitor of claim 1, wherein the mineral particles include at least one selected from the group consisting of mica, vermiculite, montmorillonite, iron montmorillonite, beidellite, saponite, hectorite, stevensite, and nontronite.

5. The capacitor of claim 1, wherein the binder includes at least one selected from the group consisting of polypropylene, polyethylene sulfide, polyimide, polyamide, polyethylene terephthalate, epoxy resins, fluororesins, polyester resins, polyurethane resins, acrylic resins, phenoxy resins, polyacetal, and polyvinyl alcohol.

6. The capacitor of claim 1, wherein content of the mineral particles in the clay layer is equal to or greater than 50% by mass with respect to an entire mass of the clay layer.

7. The capacitor of claim 1, wherein the capacitor element includes a pair of metallized films, in each of which an electrode film is formed on a dielectric film, and the pair of metallized films are wound into a roll to make the electrode films face each other with the dielectric film interposed between the electrode films.

8. The capacitor of claim 2, wherein the mineral particles include either plate-shaped particles or flake-shaped particles.

9. The capacitor of claim 1, wherein:

the external electrode comprises a first external electrode and a second external electrode, the external connection terminal comprises a first external connection terminal connected to the first external electrode and a second external connection terminal connected to the second external electrode.

10. The capacitor of claim 9, wherein the resin layer covers all of outer surfaces of the clay layer except for parts through which the first and second external connection terminals protrude.

11. The capacitor of claim 9, wherein:

the first external electrode is provided at an upper surface of the capacitor element, the second external electrode is provided at a bottom surface of the capacitor element, and the second external connection terminal extend along a side surface of the capacitor element.

12. The capacitor of claim 9, wherein the resin layer is an outermost layer of the capacitor.

* * * * *